(No Model.)
I. N. WOODLE.
THILL COUPLING.
No. 419,579. Patented Jan. 14, 1890.
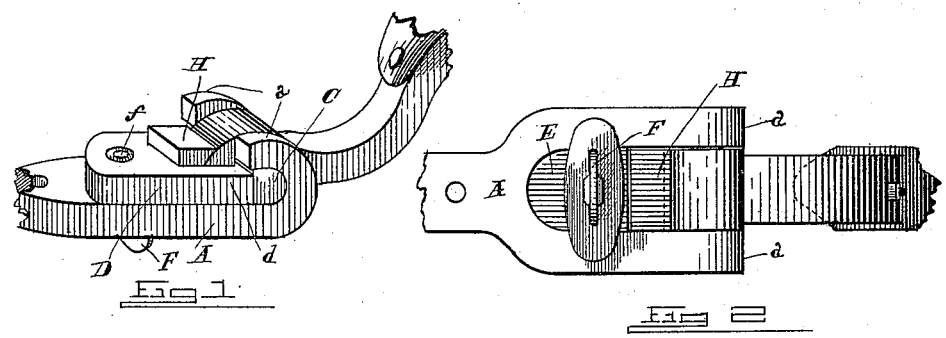
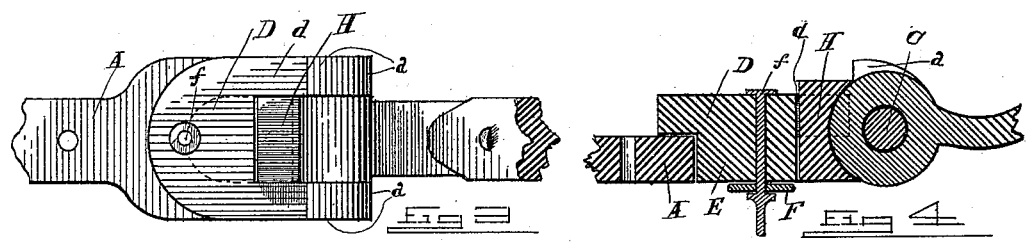
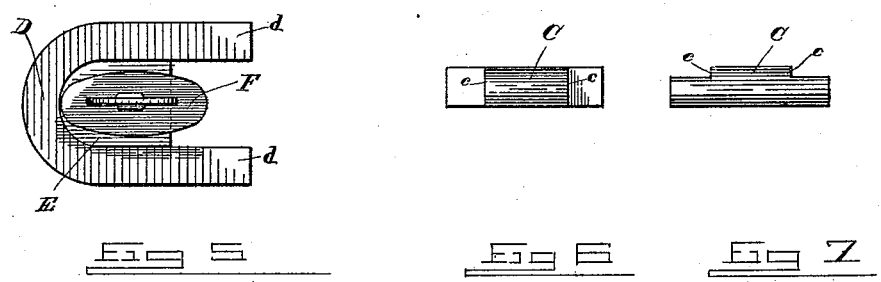
Witnesses,
Inventor,
I. N. Woodle
By his Attorney

UNITED STATES PATENT OFFICE.

ISAAC N. WOODLE, OF ALBANY, OREGON.

THILL-COUPLING.

SPECIFICATION forming part of Letters Patent No. 419,579, dated January 14, 1890.

Application filed May 1, 1889. Serial No. 309,218. (No model.)

*To all whom it may concern:*

Be it known that I, ISAAC N. WOODLE, of Albany, in the county of Linn and State of Oregon, have invented certain new and useful Improvements in Thill-Couplings; and I do hereby declare that the following is a full, clear, and exact description thereof, reference being had to the accompanying drawings, and to the letters of reference marked thereon, which form part of this specification, in which—

Figure 1 is a perspective view of my improved thill-coupling detached. Fig. 2 is a bottom view; Fig. 3, a top view partly broken away; Fig. 4, a sectional view on line $x\ x$, Fig. 2; and Fig. 5, a detail view of plate D. Figs. 6 and 7 are detail views of the rod C.

This invention relates to thill-couplings and is an improvement in such devices, its object being to provide a coupling by which the thills can be readily attached to or removed from a vehicle in which no retaining bolts and nuts are employed, and which will not rattle; and to these ends it consists in the construction, combination, and arrangement of parts hereinafter set forth.

Reference being had to the accompanying drawings, A designates the base-plate of the coupling, which is secured by a clip B and nuts to the axle of the vehicle. The said plate extends forward horizontally and is bifurcated at front, the two arms of the bifurcation having their front ends turned upward and backward on a semicircular curve, as shown at $a\ a$.

C designates a short rod resting on plate A and lying against the curved portions $a\ a$ thereof over the bifurcation therein. The said rod is shouldered near its opposite ends, as at $c$, leaving flat or angular faces on its ends at the side next the axle.

D designates a bifurcated plate corresponding in contour to the bifurcated portion of plate A, but shorter than said plate and adapted to lie thereon, and E is a depending lug of said plate adapted to enter the bifurcation of plate A when plate D is set thereon, as shown, and, engaging in the crotch of the bifurcation, prevents lateral or backward movement of plate D on plate A, while the forwardly-extending arms $d\ d$ of plate D abut against the flat faces of rod C and prevent forward movement of the plate.

F designates a turn-button pivoted on the bottom of lug E, which can be turned transversely of the lug after the plate D is engaged with plate A, as described, and when so turned its ends overlap the lug and bind on the bottom of plate A, thereby locking plate D on plate A, and thus any movement of plate D on plate A is effectually prevented. This button is preferably pivoted on a pin $f$, which extends through the lug and plate D, and is provided with a head on its lower end, whereby the same is manipulated. The arms $d\ d$ engage shoulders $c$ of rod C when the parts are properly adjusted and prevent longitudinal movement of said rod, as is evident, securely locking it in position.

In practice the eye of the shaft-iron, which is of sufficient width to fit nicely between the arms $a\ a$ of plate A, is slipped between said arms, and rod C is slipped therethrough, being supported on said arms. Plate D is then adjusted in position and secured by its button, as described, locking the shaft securely and quickly to the coupling. An anti-rattler, which may be a spring G or a cushioning-pad H, is secured in the bifurcation of plate D and bears against the rear face of the shaft-iron eye, preventing rattling thereof. If the shaft-iron were provided with trunnions, or a rod similar to C, or perfectly plain, were attached or formed with the eye, the plate D would still hold the latter securely and firmly; but by the use of rods C the coupling is adapted to be connected to single thills or poles, and either thills or pole could be readily attached to the vehicle.

Having thus described my invention, I claim.

1. The combination, with the bifurcated base-plate having upturned front ends and the shaft-iron mounted on a rod supported on said plate, of a removable plate having a depending lug engaging the bifurcation of the base-plate and forwardly-projecting arms engaging the said rod, substantially as and for the purpose described.

2. The combination of the bifurcated base-plate, the shaft-iron, and rod with the bifurcated plate having a depending lug engaging the bifurcation of the base-plate, and forwardly-extending arms adapted to retain said rod in position, and the anti-rattler device attached to said plate, substantially as and for the purpose set forth.

3. The combination of the bifurcated base-plate having the ends of its arms upturned and the shouldered rod resting on said arms with the bifurcated plate having forwardly-extending arms engaging the shoulder of said rod and locking the same in position, and also having a depending lug engaging the bifurcation of the base-plate, and the device for locking said plates, all substantially as specified.

4. The combination of the bifurcated base-plate having the front ends of its arms turned upwardly and backwardly, the shaft-iron, and the shouldered rod supporting said iron and resting on the arms of the base-plate with the bifurcated plate resting on the base-plate, having forwardly-extending arms engaging the shoulders of said rod, a depending lug engaging the bifurcation of the base-plate, a locking-button on said lug, and an anti-rattler device, all substantially as and for the purpose set forth.

In testimony that I claim the foregoing as my own I affix my signature in presence of two witnesses.

ISAAC N. WOODLE.

Witnesses:
L. H. MONTANYE,
C. C. KELLY.